United States Patent
Baca, Jr. et al.

(10) Patent No.: US 8,727,674 B2
(45) Date of Patent: May 20, 2014

(54) TOOL HOLDER WITH NUBS FOR CLAMPING A CUTTING INSERT WITH NOTCHES

(75) Inventors: John Julius Baca, Jr., Youngstown, PA (US); Ashwin Dwarakaesh Murali, Greensburg, PA (US); Kent Peter Mizgalski, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 65 days.

(21) Appl. No.: 13/398,286

(22) Filed: Feb. 16, 2012

(65) Prior Publication Data
US 2013/0216320 A1    Aug. 22, 2013

(51) Int. Cl.
*B23B 27/16* (2006.01)
(52) U.S. Cl.
USPC .............................. 407/107; 407/111; 407/106
(58) Field of Classification Search
CPC ................................ B23B 27/16; B23B 27/14
USPC ........................ 407/106, 107, 109, 111, 112
See application file for complete search history.

(56) References Cited

U.S. PATENT DOCUMENTS

| | | | | |
|---|---|---|---|---|
| 1,355,902 A | * | 10/1920 | Fuller | 407/107 |
| 3,986,237 A | * | 10/1976 | Hertel | 407/107 |
| 4,477,212 A | * | 10/1984 | Kraft | 407/104 |
| 4,714,384 A | * | 12/1987 | Lagerberg | 407/103 |
| 6,379,087 B1 | * | 4/2002 | Alexander, IV | 407/107 |
| 6,457,914 B1 | | 10/2002 | Andras et al. | |
| 7,195,427 B2 | * | 3/2007 | Sjoo et al. | 407/82 |
| 7,547,163 B2 | * | 6/2009 | Morrison et al. | 407/103 |
| 2010/0209206 A1 | | 8/2010 | Holwerk et al. | |
| 2010/0303562 A1 | * | 12/2010 | Hecht | 407/107 |
| 2012/0141216 A1 | * | 6/2012 | Zitzlaff | 407/107 |
| 2013/0051941 A1 | * | 2/2013 | Ben Amor et al. | 407/64 |

FOREIGN PATENT DOCUMENTS

| | | |
|---|---|---|
| DE | 1951784 U | 12/1966 |
| DE | 102005006589 A1 | 8/2006 |
| JP | 2004-042157 A * | 2/2004 ............. B23B 27/16 |

* cited by examiner

*Primary Examiner* — Andrea Wellington
*Assistant Examiner* — Ryan Rufo
(74) *Attorney, Agent, or Firm* — Larry R. Meenan, Esq.

(57) ABSTRACT

A tool holder includes a tool holder body with an insert-receiving pocket and a clamp for clamping a cutting insert. The clamp includes a pair of downwardly extending nubs that engage a pair of notches in the cutting insert when the clamp is brought into pressing engagement with the insert, thereby securely clamping the cutting insert in the insert-receiving pocket of the tool holder.

11 Claims, 7 Drawing Sheets

TOOL HOLDER WITH NUBS FOR CLAMPING A CUTTING INSERT WITH NOTCHES

FIELD OF THE INVENTION

The present invention pertains to a tool holder for clamping cutting inserts. More particularly, the present invention relates to a tool holder for clamping a "dogbone" cutting insert securely to the tool holder.

BACKGROUND OF THE INVENTION

Typically, tool holder mechanisms utilize a conical bore whose axis is offset from the threaded section of the locking pin receiving hole to tilt the locking pin into abutment with the cutting insert. These designs are difficult to machine because the location of the conical bore must be maintained within a relatively tight tolerance if it is to achieve the desired tilting of the locking pin. Therefore, there is a need to provide a tool holder for clamping an insert that is simple to manufacture and has improved manufacturing tolerances. Examples of a clamping toolholder is shown in U.S. Pat. Nos. 6,457,914 and 7,547,163.

SUMMARY OF THE INVENTION

The problem of clamping a more cost-effective insert is solved by providing a pair of notches on opposite sides of the cutting insert and a corresponding pair of nubs on a clamp that engage the notches to securely hold the insert in place.

In one aspect of the invention, a tool holder for releasably clamping an insert having a pair of notches comprises a tool holder body including an insert-receiving pocket formed at a forward end thereof and having a bottom and at least one side wall for receiving the insert, the tool holder body further including a clamp-securing bore having a central axis forming an angle with respect to a plane of the tool holder body; a clamp arranged on the tool holder body, the clamp including a top surface, a forward lower face and a rearward lower face, and an aperture formed therethrough, the clamp including a nose portion with a pair of downward extending nubs; and a clamp screw capable of being inserted through the aperture of the clamp and at least partially received in the clamp-securing bore of the tool holder body to bring the clamp into pressing engagement with the insert, wherein the pair of nubs of the clamp engage the pair of notches in the cutting insert when the clamp is brought into pressing engagement with the insert, thereby securely clamping the cutting insert in the insert-receiving pocket of the tool holder.

In another aspect of the invention, a cutting insert for a tool holder comprising a pair of notches formed in the insert, each notch having a forward surface, a rearward surface and root therebetween, the root having a minimum radius.

In another aspect of the invention, a method of clamping a cutting insert to a tool holder, the insert including a pair of notches, the tool holder including a clamp having a pair of nubs extending downward from a nose portion, the method comprising the steps of:

placing the cutting insert within an insert-receiving pocket of the tool holder;

aligning an aperture of the clamp with a clamp-securing bore of the tool holder; and inserting a clamp screw into the aperture of the clamp such that the clamp screw is at least partially received in clamp-securing bore of the tool holder to bring the clamp into pressing engagement with the insert, wherein the pair of nubs of the clamp engage the pair of notches on the cutting insert when the clamp is brought into pressing engagement with the insert, thereby securely clamping the cutting insert in the insert-receiving pocket of the tool holder.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Referring now to FIGS. 1-6, a clamping tool holder 10 is shown according to an embodiment of the invention. The clamping tool holder 10 comprises a tool holder body 12 having an insert-receiving pocket 14 formed in its upper surface 16 at a corner of its forward end portion. The insert receiving pocket 14 has a bottom 18 and angularly-disposed side walls 20a, 20b forming an apex 21 at the intersection between the side walls 20.

Figure 1:
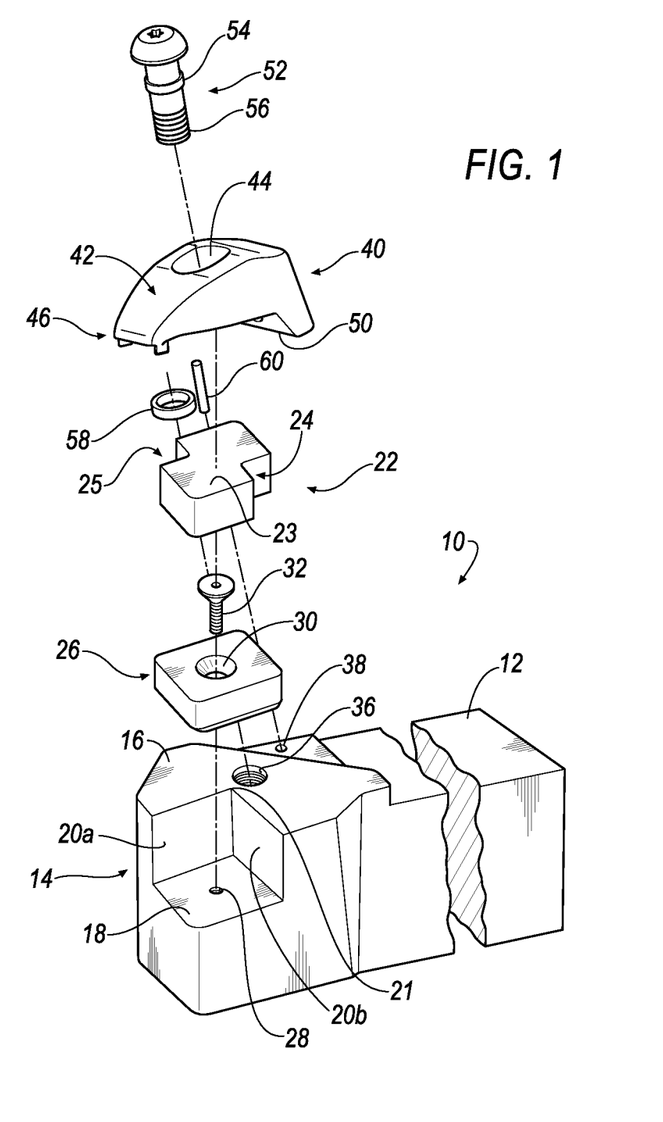
FIG. 1 is an exploded side isometric view of a tool holder and cutting insert in accordance with an embodiment of the invention.
Figure 2:
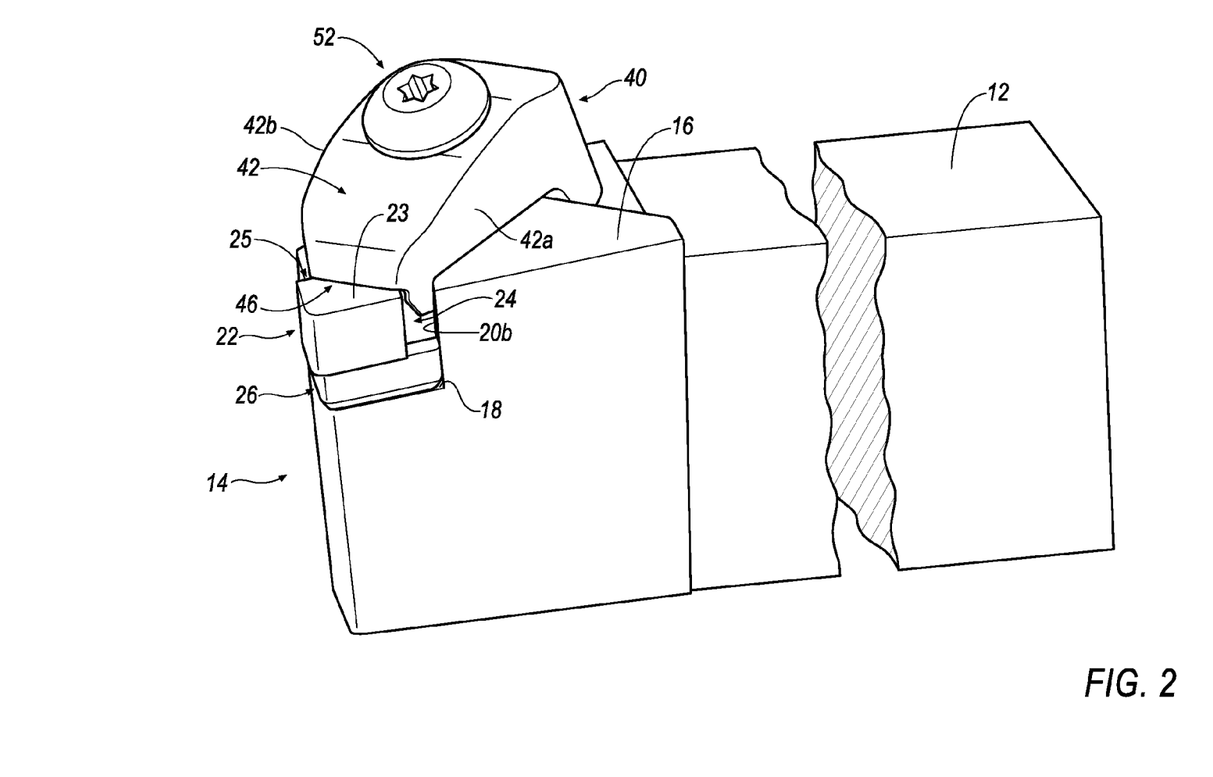
FIG. 2 is an isometric view of the tool holder and cutting insert of FIG. 1 when assembled.

In the illustrated embodiment, the cutting insert 22 is generally diamond in shape and has a pair of notches 24, 25 formed in two opposite sides of the insert 22, thereby giving the cutting insert 22 a "dogbone" shape. In other words, the illustrated cutting insert has four sides in which the notches 24, 25 are formed in opposite corners of adjacent sides. However, it will be appreciated that the cutting insert can have any polygonal shape, such as a triangle, rectangle, pentagon, and the like. For example, the cutting insert 22 can be triangular in shape in which a notch can be located on one or more legs of the triangle. In other words, the notches can be located along the sides, for example, at the median for a cutting insert having an odd number of sides, and located on the corners of adjacent sides for a cutting insert having an even number of sides.

Figure 3:
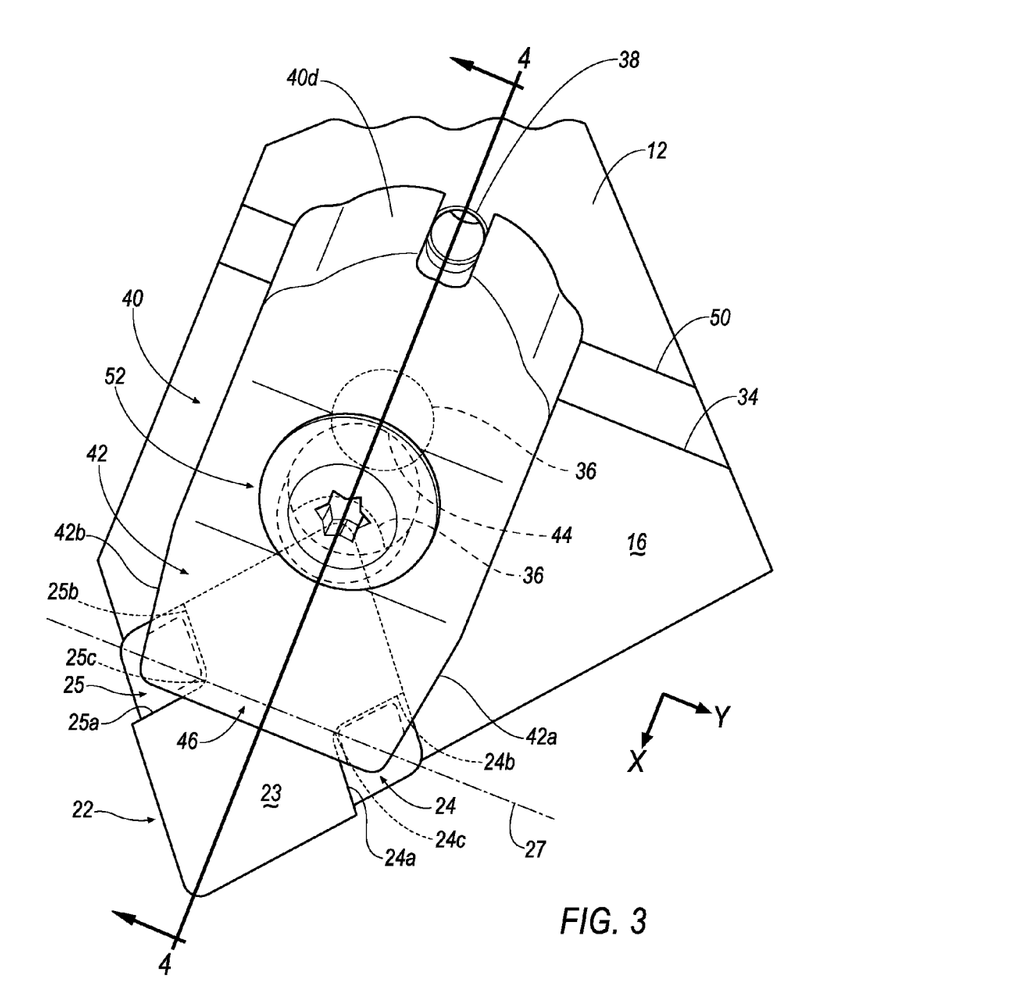
FIG. 3 is a partial enlarged top view of the clamp of the tool holder and the cutting insert.

Each notch 24, 25 has a forward surface 24a, 25a (i.e., closer to the forward end of the tool holder 10), rearward surface 24b, 25b (i.e., closer to the rearward end of the tool holder 10), and a root 24c, 25c between the surfaces 24a, 24b and 25a, 25b having a minimum radius of about 0.002 inches (0.05 mm) (FIG. 3). The radius of the roots 24c, 25c is effective for reducing stresses on the cutting insert 10. In the illustrated cutting insert 22, the roots 24c, 25c are located along a plane 27 that is generally parallel to the Y-axis (i.e., perpendicular to the X-axis), as shown in FIG. 3. It will be appreciated that the cutting insert is not limited to two notches, but could also have more notches, so long as the additional number of notches does not effect the structural integrity of the cutting insert 22. An optional seat member 26 can be disposed between the cutting insert 22 and the bottom 18 of the pocket 14 for supporting the cutting insert 22 when mounted in the pocket 14.

An internally threaded bore 28 is formed in the bottom 18 of the pocket 14, and a bore 30 formed through the seat member 26. The seat member 26 is fixedly secured to the insert-receiving pocket 14 by means of a screw 32 inserted through the bore 30 and screwed into the threaded bore 28. In an alternative embodiment, the insert 22 can be disposed on the bottom 18 of the pocket 14 without the use of the seat member 26 and the head screw 32. In this alternative embodiment, it is not necessary to include the threaded bore 28 in the tool holder body 12.

Figure 4:
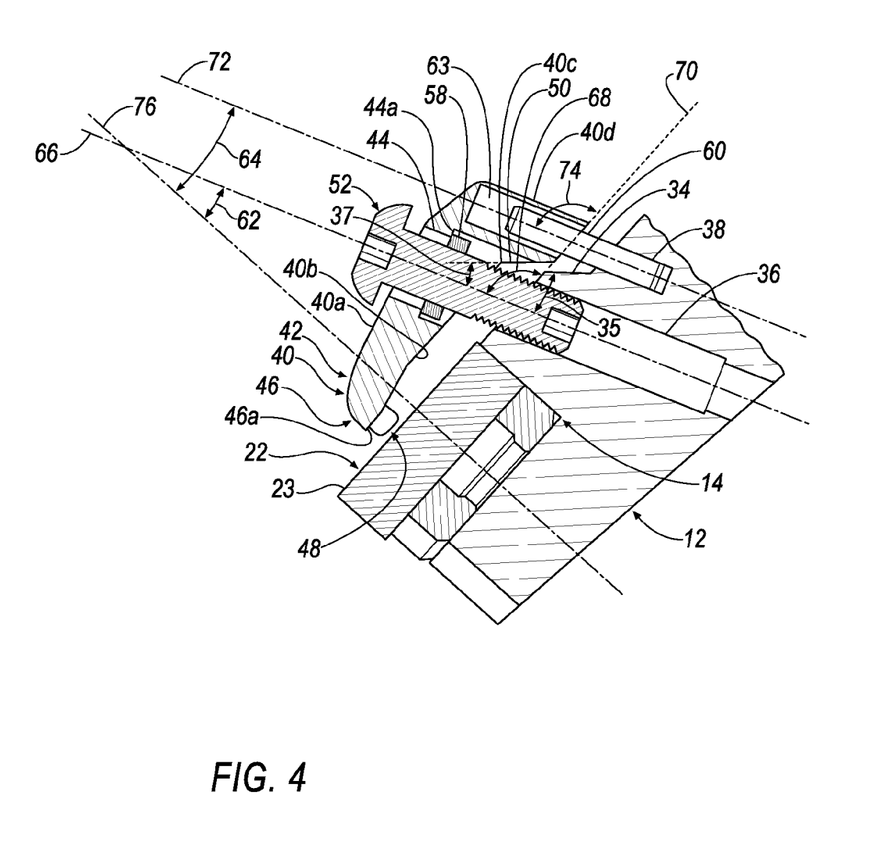
FIG. 4 is a partial cutaway cross-sectional view of the tool holder in an unclamped position taken along line 4-4 of FIG. 3.

As shown in FIGS. 3 and 4, the tool holder 10 includes an inclined surface 34 sloping inwardly in a direction away from the insert-receiving pocket 14 formed on that portion of the upper surface 16 of the tool body 12 that is displaced rearwardly of the tool body 12 with respect to the pocket 14. An internally threaded clamp-securing bore 36 is formed in the tool holder 10 and is located between the inclined surface 34 and the insert-receiving pocket 14. The inclined surface 34 is formed at a prescribed angle 35 with respect to a central axis 66 of the clamp-securing bore 36. In an embodiment, the angle 35 is about twenty-four degrees. In this embodiment, the central axis 66 of the clamp-securing bore 36 forms an angle 68 that is not perpendicular to a plane 70 formed by the upper surface 16 of the body 12.

The tool holder 10 further includes a pin-receiving bore 38 formed in the body 12 of the tool holder 10. The pin-receiving bore 38 maintains alignment of the clamp 40 and the tool body 12 as the clamp 40 presses downward and rearward on the insert 22. In the illustrated embodiment, the inclined surface 34 is located between a pin-receiving bore 38 and the clamp-securing bore 36. Alternatively, the pin-receiving bore 38 can be located between the inclined surface 34 and the clamp-securing bore 36. In this embodiment, a central axis 72 of the pin-receiving bore 38 is substantially parallel with the central axis 66 of the clamp-securing bore 36. Thus, the central axis 72 of the pin-receiving bore 38 forms an angle 68 that is not perpendicular with respect to a plane 70 of the body 12.

In addition, the central axis 72 of the pin-receiving bore 38 in the tool holder 10 is substantially parallel to the central axis 66 of the clamp-securing bore 36. In other words, the angle 74 is approximately equal to angle 68. As a result, the central axes 66, 72 of the clamp-securing bore 36 and the pin-receiving bore 38 do not intersect one another. However, in another embodiment, the angle 74 could be different than angle 68 such that the central axes 66, 72 would intersect one another.

Figure 5:
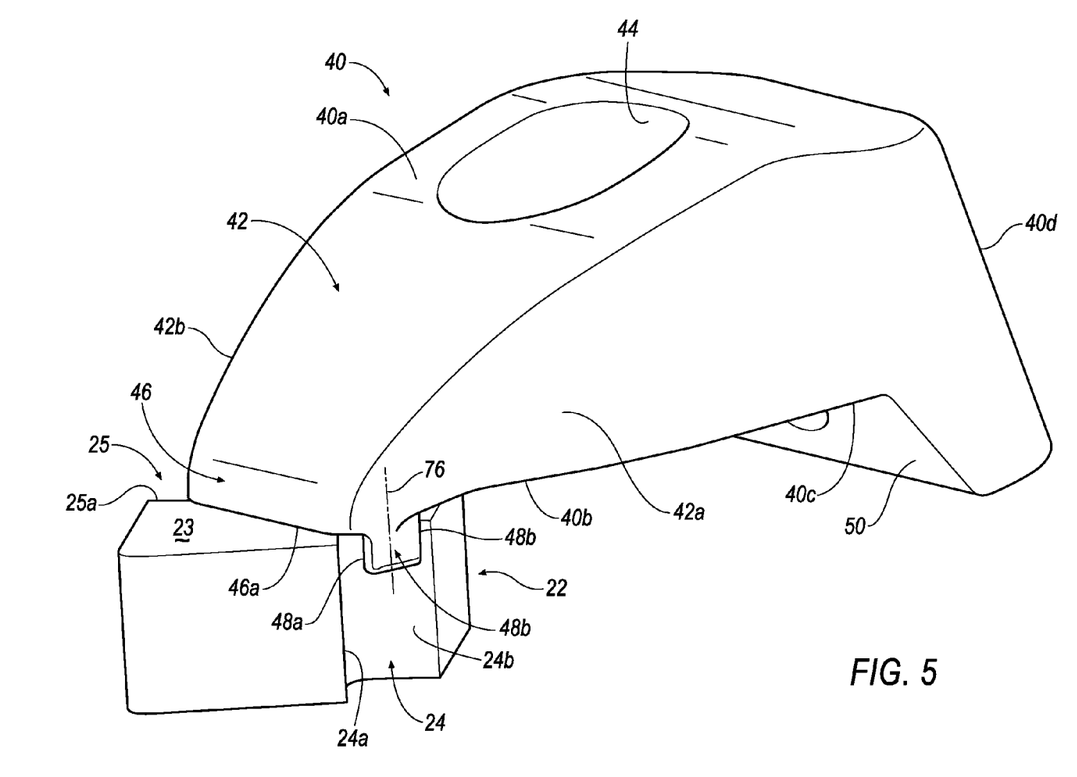
FIG. 5 is an enlarged isometric view of the clamp with downwardly extending nubs and cutting insert with notches in accordance with the invention.

As shown in FIG. 5, the tool holder 10 includes a clamp 40 for securely clamping the cutting insert 22 in the pocket 14. The clamp 40 is of a generally C-shape in side elevation having a tapered forward portion 42 and tapered side portions 42a, 42b to provide a low profile design. The low profile design facilitates the removal of chips during the cutting process. Formed in the center of the clamp 40 is a non-circular or oblong-shaped aperture 44 having a greater dimension along its longitudinal axis. The non-circular aperture 44 allows for some movement of the clamp 40 along its longitudinal axis, but does not allow as much movement perpendicular to the longitudinal axis of the clamp 40. As shown in FIG. 1, the aperture 44 is formed so that its central axis is substantially concentric with the central axis 66 of the clamp-securing bore 36 of the tool body 12. The clamp 40 also includes a top surface 40a, a substantially planar forward lower face 40b and a substantially planar rearward lower face 40c, as shown in FIG. 5.

The forward end of the clamp 40 includes a curved nose portion 46 having a lower face 46a to be held in engagement with a top surface 23 of the insert 22 (i.e., the surface facing upward when the cutting insert is mounted in the pocket). The forward lower face 46a of the nose portion 46 assists in distributing the downward and rearward force of the clamp 40 over the top surface 23 of the insert 22. The forward lower face 40b of the clamp 40 is formed to be higher in elevation than the forward lower face 46a of the nose portion 46 so as to not engage the insert 22 when the forward lower face 46a of the nose portion 46 engages the top surface 23 of the insert 22.

Figure 6:
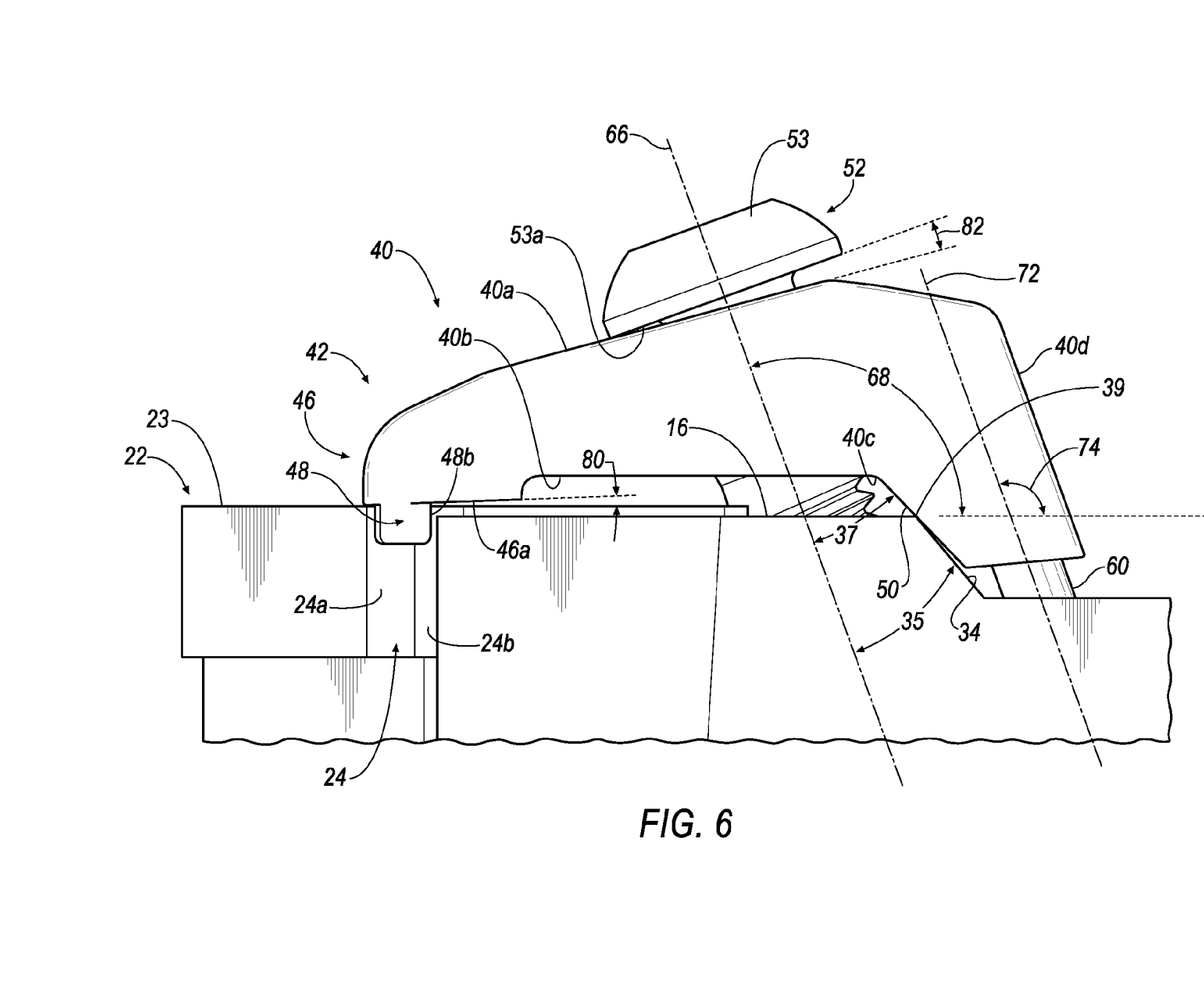
FIG. 6 is an enlarged partial side view of the tool holder in the clamped position in accordance with the invention.

As shown in FIG. 6 another aspect of the invention is that only the forward lower face 46a of the nose portion 46 of the clamp 40 contacts the top surface 23 of the insert 22 when the clamp 40 is brought into pressing engagement with the insert 22. In other words the forward lower face 46a forms an angle 80 with respect to the top surface 23 of the insert 22 when the clamp 40 is brought into pressing engagement with the insert 22. Yet another aspect of the invention is that only the forward lower face 53a of the clamp screw 52 engages the top surface 40a of the clamp 40 to further bring the nubs 48, 49 and the forward lower portion 46a of the clamp 40 into pressing engagement with the insert 22. In other words the forward lower face 53a forms an angle 82 with respect to the top surface 40a of the clamp 40 when the clamp 40 is brought into pressing engagement with the insert 22.

In another aspect, the nose portion 46 of the clamp 40 includes a pair of downward extending nubs 48, 49 that engage the notches 24, 25 of the insert 22 when the tool holder 10 is brought into a clamped position. Each nub 48, 49 includes a forward surface 48a, 49a and a rearward surface 48b, 49b. The central axes 66, 72 of the clamp-securing bore 36 and the pin-receiving bore 38 are at angles 62, 64 (FIG. 4) with respect to a vertical axis 76 (i.e., parallel to Z-axis) of the nubs 48, 49 (FIG. 5). In an embodiment, the angles 62, 64 are approximately 20 degrees that causes the rearward surfaces 48b, 49b of the nubs 48, 49 to engage the rearward surface 24b, 25b of the notches 24, 25 and exert a downward and rearward force on the insert 22, thereby causing the insert 22 to be securely clamped in the pocket 14. This downward and rearward force may or may not be in alignment with the apex 21 of the pocket 14.

The clamp 40 has an inclined surface 50 formed at a proximal end thereof so as to protrude downward and rearward with respect to the clamp-receiving bore 36. The inclined surfaces 34, 50 act as ramp surfaces when the tool holder 10 is moved from an unclamped position to a clamped position, and vice versa. However, the inclined surface 50 is formed at an angle 37 with respect to the central axis 66 of the clamp-receiving bore 36 that is slightly different than the angle 35 of the inclined surface 34 of the tool holder 10. In an embodiment, the angle 37 is about 24 degrees. As seen in FIG. 6, this difference between the angles 35, 37 causes the clamp 40 to pivot about a pivot point 39 when the tool holder 10 is moved from the unclamped position to the clamped position. In the illustrated embodiment, the pivot point 39 is located at the intersection between the upper surface 16 and the inclined surface 34 of the tool holder 10. This pivoting action of the clamp 40 causes the clamp 40 to further exert a force downward and rearward when bringing the clamp 40 into pressing engagement with the insert 22, thereby enhancing the "pull back" feature of the invention.

It should be noted that the relative angle between the clamp-securing bore 36 and the inclined surfaces 34, 50 can be "tuned" to provide a desired downward force and/or rearward force on the insert 22. In one embodiment, the angle of the clamp-securing bore 36 of the inclined surfaces 34, 50 are approximately 24 degrees with respect to the central axis 66 of the clamp-receiving bore 36 to provide slightly more downward force than rearward force on the insert 22. However, it will be appreciated that the relative angle between the clamp-securing bore 36 and the inclined surfaces 34, 50 may be any desired angle to provide the desired ratio of downward to rearward force on the insert 22.

The clamp 40 also includes a pin-receiving slot 63 positioned between the inclined surface 50 and a rear surface 40d of the clamp 40. As shown in FIG. 4, the pin-receiving slot 63 of the clamp 40 is formed so that its axis is substantially concentric with the axis of the pin-receiving bore 38 of the body 12 of the tool holder 10. The pin-receiving slot 63 may be non-circular or oblong-shaped having a greater dimension along its longitudinal axis. The non-circular pin-receiving slot 63 allows for some movement along its longitudinal axis, but does not allow as much movement perpendicular to the longitudinal axis. A guide pin 60 is disposed within the pin-receiving bore 38 and the pin-receiving slot 63 to prevent the clamp 40 from spinning or twisting in a circumferential direction (in a direction perpendicular to the direction of travel of the clamp screw 52) when turning of the clamp screw 52 to loosen or tighten the clamp 40. Although the guide pin 60 can be formed of a solid pin, the guide pin 60 is preferably formed of a slotted spring pin that can flex, expand or compress to allow for variations in design and wear of the tool holder 10. Specifically, the slotted spring pin 60 can flex to maintain the relative positions of the aperture 44, the bore 36, the pin-receiving bore 38 of the tool body 12 and the pin-receiving slot 63 of the clamp 40 to compensate for changes in the relative angle of the axes 66, 72 of the bores 36, 38, respectively, that may result due to manufacturing tolerances and wear of the tool body 12 and the clamp 40 (i.e., alignment creep). The guide pin 60 can be press fit into the pin-receiving bore 38 of the tool holder body 12. The length of the guide pin 60 is selected to allow the clamp 40 to move away from the insert 22 while preventing the clamp 40 from spinning or twisting in the circumferential direction.

It will be appreciated that the smaller width of the pin-receiving slot 63 can be slightly larger than the diameter of the guide pin 60 to allow free movement of the guide pin 60 within the pin-receiving slot 63. It will be appreciated that the pin-receiving slot 63 and guide pin 60 can be eliminated by forming the inclined surfaces 34, 50 with convex, concave or contour complementary shaped surfaces. Oppositely, the inclined surfaces 34, 50 can be eliminated and made integral with the guide pin 60 or attached as a separate component when retrofitting a conventional tool holder.

As shown in FIGS. 1 and 6, the clamp 40 is secured to the tool holder body 12 by means of a clamp screw 52 having a head portion 53, a shoulder 54 and a threaded portion 56. The head portion 53 includes a lower face 53a that is substantially perpendicular to the central axis 66 of the clamp-receiving bore 36. However, the top surface 40a of the clamp 40 forms an angle with respect to the lower face 53a when the tool holder 10 is placed in the clamped position. As a result, only the front portion of the lower face 53a engages the top surface 40a of the clamp 40 when the tool holder 10 is brought into the clamped position.

During assembly of the tool holder 10, the threaded portion 56 is inserted through the aperture 44 and screwed into the threaded clamp-securing bore 36. It will be appreciated that the threads of the bore 36 may be slightly larger than the threads of the clamp screw 52 to allow for variations in design, i.e. manufacturing tolerances in the tool holder 10.

Figure 7:
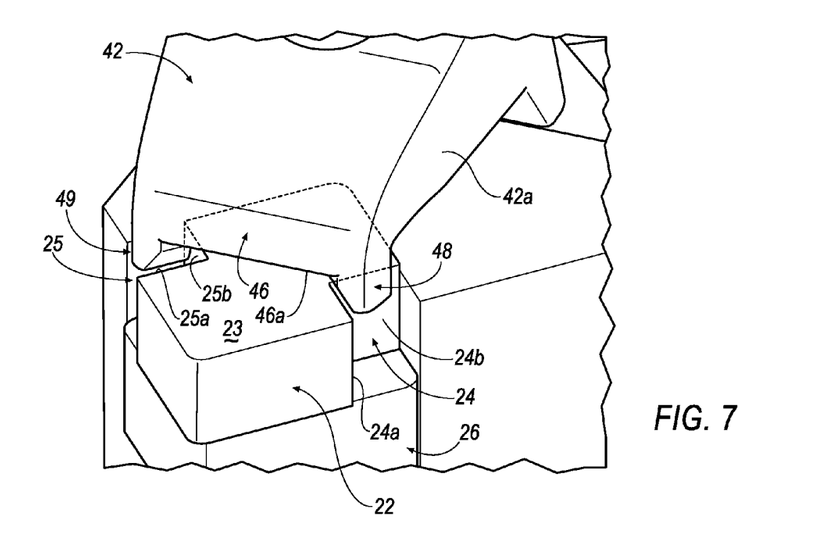
FIG. 7 is an enlarged isometric view of the clamp and the cutting insert when in an unclamped position in accordance with the invention.
Figure 8:
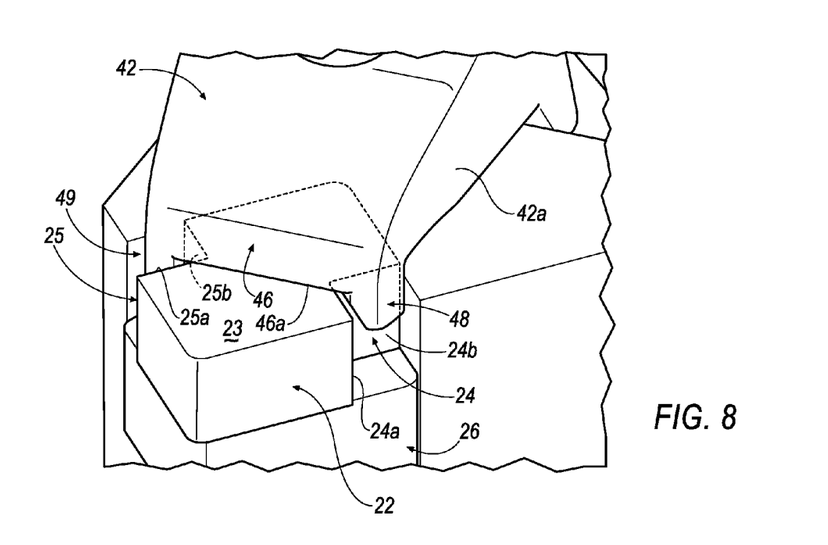
FIG. 8 is an enlarged isometric view of the clamp and the cutting insert when in a clamped position in accordance with the invention.

With reference to FIGS. 7 and 8, the clamping operation of the tool holder 10 using the clamp 40 will now be described. FIG. 7 shows the tool holder 10 in an unclamped position, and FIG. 8 shows the tool holder 10 in a clamped position. Usually, since the clamping operation is required only when replacing the cutting insert with a new one, it is normally not necessary to move the clamp 40 upward from the clamped position shown in FIG. 8 to the unclamped position shown in FIG. 7. Therefore, there may be provided a stop member (not shown) to prevent the clamp screw 52 from being further loosened from the state shown in FIG. 7.

From the unclamped position shown in FIG. 7, the clamp screw 52 is rotated in a clockwise direction to screw the clamp screw 52 into the clamp-securing bore 36 and cause the clamp 40 to move downward and rearward with respect to the insert 22. The clamp 40 is guided by guide pin 60 as it moves downward and rearward along the axis of the pin-receiving bore 38 of the body 12 of the tool holder 10. It should be noted that the nubs 48, 49 of the clamp 40 move in a direction that may or may not be in alignment with the apex 21 of the pocket 14.

As the clamp 40 is further tightened by turning the clamp screw 52, the rearward surfaces 48b, 49b of the nubs 48, 49 positively engage the rearward surfaces 24b, 25b of the notches 24, 25 of the insert 22. In addition, only the forward lower face 46a of the nose portion 46 engages the top surface 23 of the insert 22 when in the clamped position. It is noted that the forward lower face 40b of the clamp 40 does not engage the insert 22 because the lower face 40b is higher in elevation than the lower face 46a of the nose portion 46 of the clamp 40. In other words, the forward lower face 46a forms an angle 80 with respect to the top surface 23 of the insert 22 when the clamp 40 is brought into pressing engagement with the insert 22 (FIG. 6).

As the clamp 40 is further tightened, the lower face 53a of the clamp screw 52 engages the top surface 40a of the clamp 40, further causing the forward lower face 46a of the clamp 40 to press against the top surface 23 of the insert 22. Further, the inclined surfaces 34, 50 act as a ramp about the pivot point 39 to further cause the clamp 40 to press the insert 22 downward and rearward to further secure the insert 22 to the pocket 14.

When removing the insert 22 from the tool holder body 12, the clamp screw 52 is turned in a counter clockwise direction to cause the ring 58 to engage a ledge 44a of the clamp 40 to assist in lifting the clamp 40, as shown in FIG. 4. As the clamp screw 52 is further turned, the inclined surface 50 is separated from the inclined surface 34. In this released condition, the nose portion 46 of the clamp 40 is positioned above the insert 22 such that the insert 22 can be easily removed and replaced by a new insert 22. Accordingly, the clamp 40 is released such that replacing operation for the insert 22 can be conducted efficiently.

As described above, the tool holder 10 provides the advantages of reducing insert breakage due to impact due to more rigidity as compared to conventional tool holders. In addition, the cutting insert 22 is cost/price competitive because the "dogbone" cutting insert requires less material than a conventional insert with the same geometric shape. That is, a "dogbone" diamond-shaped insert has less material than a diamond-shaped insert of the same size. Further, the tool holder 10 offers better rigidity than the conventional tool holder as it is clamped on the sides as well as the top of the cutting insert. Even further, the cost/price competitiveness can be realized in conventional tool holders because the "dogbone" cutting insert 22 and the clamp 40 of the tool holder 10 can be retrofit into the some conventional clamping tool holders, such as those described in U.S. Pat. Nos. 6,457,914 and 7,547,163.

The patents and publications referred to herein are hereby incorporated by reference.

Having described presently preferred embodiments the invention may be otherwise embodied within the scope of the appended claims.

What is claimed is:

1. A tool holder for clamping a cutting insert comprising a first side, a second side, a third side parallel to the first side and a fourth side parallel to the second side, a first corner at an intersection between the first and second sides, a second corner opposite the fist corner at an intersection between the third and four sides, a third corner at an intersection between the first and fourth sides, a fourth corner opposite the third corner at an intersection between the second and third sides, a top surface, a bottom surface, a first notch formed in the first corner and a second notch formed in the second corner, the first notch including a first forward surface, a first rearward surface and a first root between the first forward surface and the first rearward surface, the second notch including a second forward surface, a second rearward surface and a second root between the second forward surface and the second rearford surface, the first and second roots being intersected by a plane that is perpendicular to a longitudinal axis of the cutting insert that intersects the third and fourth corners, the tool holder comprising:

a tool holder body including an insert-receiving pocket formed at a forward end thereof and having a bottom and at least one side wall for receiving the cutting insert;

a clamp arranged on the tool holder body, the clamp including a top surface, a forward lower face and a rearward lower face, and an aperture formed therethrough, the clamp including a nose portion with a pair of downward extending nubs; and a clamp screw capable of being inserted through the aperture of the clamp and at least partially received in a clamp-securing bore of the tool holder body to bring the clamp into pressing engagement with the insert, wherein a central axis of the clamp-securing bore is formed at an angle with respect to an axis of the pair of downward extending nubs, and wherein the pair of nubs of the clamp engage the first and second notches in the cutting insert to exert a downward and rearward force on the cutting insert when the clamp is brought into pressing engagement with the insert, thereby securely clamping the cutting insert in the insert-receiving pocket of the tool holder.

2. The tool holder according to claim 1, wherein each nub of the clamp has a forward surface and a rearward surface, and wherein each notch of the insert has a forward surface and a rearward surface, and wherein the rearward surface of each nub engages the rearward surface of each notch when the clamp is brought into pressing engagement with the insert.

3. The tool holder according to claim 1, wherein the tool holder body includes an inclined surface having a prescribed angle with respect to the central axis of the clamp-securing bore, and wherein the clamp further includes an inclined surface formed at a different prescribed angle than the prescribed angle of the inclined surface of the tool holder body, thereby causing the clamp to pivot about a pivot point when the clamp is brought into pressing engagement with the insert.

4. The tool holder according to claim 1, wherein the tool holder body also includes a pin-receiving bore having a central axis formed at an angle with respect to the plane of the tool holder body.

5. The tool holder according to claim 4, wherein the central axis of the pin-receiving bore is substantially parallel to the central axis of the clamp-securing bore.

6. The tool holder according to claim 1, wherein the aperture of the clamp is oblong-shaped to allow movement of the clamp along its longitudinal axis.

7. The tool holder according to claim 1, wherein the clamp screw further includes a head portion, a shoulder and a threaded portion.

8. The tool holder according to claim 7, wherein the head portion includes a lower face that forms an angle with respect to the top surface of the clamp when the clamp is brought into pressing engagement with the insert.

9. A cutting insert for a tool holder comprising a first side, a second side, a third parallel to the first side and a fourth side parallel to the second side, a first corner at an intersection between the first and second sides, a second corner opposite the first corner at intersection between the third and four sides, a third corner at an intersection between the first and fourth corner opposite the third corner at an intersection between the second and third sides, a top surface, a bottom surface, and a first notch formed in the first corner and a second notch formed in the second corner, the first notch including a first forward surface, a first rearward surface and a first root between the first forward surface and the first rearward surface, the second notch including a second forward surface, a second rearward surface and a second root between the second forward surface and the second rearward surface, the first and second roots being intersected by a plane that is perpendicular to a longitudinal axis of the cutting insert that intersects the third and fourth corners, a the first and second roots having a minimum radius, wherein the rearward surface of each notch engage a rearward surface of a respective nub on a curved nose portion of a clamp of the tool holder in such a way that only a forward lower face of the nose portion engages the top surface of the insert to exert a downward and rearward force on the insert when the clamp is brought into pressing engagement with the insert.

10. The cutting insert according to claim 9, wherein the minimum radius is 0.002 inches.

11. A method of clamping a cutting insert to a tool holder, the insert comprising a first side, a second side, a third side parallel to the first side and a first side parallel to the second side, a first corner at an intersection between the first and second sides, a second corner opposite the first corner at an intersection between the third and four sides, a third corner at an intersection between the first and fourth sides, a fourth corner opposite the third corner at an intersection between the second and third sides, a top surface, a bottom surface, a first notch formed in the first corner and a second notch formed in the second corner, the first notch including a first forward surface, a first rearward surface and a first root between the first forward surface and the first rearwards surface, the second notch including a second forward surface, a second rearward surface and a second root between the second forward surface and the second rearward surface, the first and second roots being intersected by a plane that is perpendicular to a longitudinal axis of the cutting insert, which intersects the third and fourth corners, the tool holder including a clamp including a curved nose portion with a forward lower face, the curved nose portion having a pair of nubs extending downward from the curved nose portion, the method comprising the steps of:

placing the cutting insert within an insert-receiving pocket of the tool holder;

aligning an aperture of the clamp with a clamp-securing bore of the tool holder; and     inserting a clamp screw into the aperture of the clamp such that the clamp screw is at least partially received in the clamp-securing bore of the tool holder to bring the clamp into pressing engagement with the insert,     wherein the pair of nubs of the clamp engage the pair of notches in the cutting insert to exert a downward and rearward force on the insert when the clamp is brought into pressing engagement with the insert, thereby securely clamping the cutting insert in the insert-receiving pocket of the tool holder.

\* \* \* \* \*